(12) United States Patent
Chattopadhyay et al.

(10) Patent No.: US 10,164,798 B2
(45) Date of Patent: Dec. 25, 2018

(54) DRIVER CIRCUIT FOR TRANSMITTER

(71) Applicant: Synopsys, Inc., Mountain View, CA (US)

(72) Inventors: Biman Chattopadhyay, Bengaluru (IN); Ravi Mehta, Bengaluru (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/427,554

(22) Filed: Feb. 8, 2017

(65) Prior Publication Data

US 2018/0159703 A1    Jun. 7, 2018

(30) Foreign Application Priority Data

Dec. 5, 2016  (IN) .............................. 201641041422

(51) Int. Cl.
*H04L 13/16* (2006.01)
*H04L 25/02* (2006.01)

(52) U.S. Cl.
CPC .......... *H04L 13/16* (2013.01); *H04L 25/0284* (2013.01); *H04L 25/0286* (2013.01)

(58) Field of Classification Search
CPC . H04L 13/16; H04L 25/0286; H04L 25/0284; H04L 25/0272; H04L 25/0278; H04L 25/03343; H04L 25/03878; G05F 1/56; H03F 3/45192; H03F 3/3064; H04B 1/16; H04B 1/04; H03K 17/16; H03K 17/163; H03K 17/6872; H03M 9/00

See application file for complete search history.

(56) References Cited

U.S. PATENT DOCUMENTS 6,335,637 B1 *  1/2002  Correale, Jr. .... H03K 19/00315
                                                        326/56
6,388,469 B1 *  5/2002  Hunt ................ H03K 3/356113
                                                        326/68

(Continued)

OTHER PUBLICATIONS

P. H. Saul, K. M. Brunson and R. J. T. Bunyan, "Versatile high voltage level shift and driver for MEMS applications," in Electronics Letters, vol. 39, No. 2, pp. 185-186, Jan. 23, 2003. doi: 10.1049/el:20030144.*

(Continued)

*Primary Examiner* — Sam K Ahn
*Assistant Examiner* — Amneet Singh
(74) *Attorney, Agent, or Firm* — Fenwick & West LLP (57) ABSTRACT

A driver circuit includes a first inverter, a bias-control circuit, and a second inverter. The first inverter, which is connected between a first supply voltage and ground, receives an input data signal and generates an inverted version of the input data signal. The bias-control circuit, which is connected between a second supply voltage and the first inverter, receives the inverted version of the input data signal and a bias signal, and generates a level-shifted data signal based on the inverted version of the input data signal, the bias signal, and the second supply voltage. The bias-control circuit reduces a difference between voltage levels of the second supply voltage and the inverted version of the input data signal. The second inverter is connected between the second supply voltage and ground, and further connected to the bias-control circuit and first inverter and generates an output data signal.

24 Claims, 3 Drawing Sheets

(56) References Cited

U.S. PATENT DOCUMENTS

| | | | | | |
|---|---|---|---|---|---|
| 6,388,499 | B1* | 5/2002 | Tien | ............... | H03K 19/00315 327/112 |
| 6,842,320 | B1* | 1/2005 | Mathur | ............ | H03K 19/00315 361/90 |
| 7,190,191 | B1* | 3/2007 | Mathur | ................. | H02H 9/004 326/68 |
| 7,295,040 | B1* | 11/2007 | Nguyen | ........... | H03K 19/00315 326/68 |
| 7,893,720 | B2* | 2/2011 | Yadav | ........... | H03K 19/018528 326/26 |
| 8,466,722 | B2* | 6/2013 | Kossel | ............... | H01L 27/0266 327/142 |
| 2002/0186047 | A1* | 12/2002 | Sterrantino | ......... | H03F 3/45179 326/86 |
| 2005/0258864 | A1* | 11/2005 | Chen | ............... | H03K 3/356113 326/81 |
| 2007/0115041 | A1* | 5/2007 | Tachibana | ........ | H03K 3/356113 327/333 |
| 2007/0159218 | A1* | 7/2007 | Srinivas | ........... | H03K 3/356104 327/108 |
| 2008/0106836 | A1* | 5/2008 | Benzer | .................... | H03K 5/08 361/56 |
| 2008/0260049 | A1* | 10/2008 | Wood | ................ | G06F 13/4072 375/257 |
| 2009/0206887 | A1* | 8/2009 | Boyko | ................... | H03F 1/523 327/108 |
| 2009/0207544 | A1* | 8/2009 | Boyko | ........... | H03K 19/00315 361/91.1 |

OTHER PUBLICATIONS

B. B Serneels, M. Steyaert and W. Dehaene, "A High speed, Low Voltage to High Voltage Level Shifter in Standard 1.2V 0.13μm CMOS," 2006 13th IEEE International Conference on Electronics, Circuits and Systems, Nice, 2006, pp. 668-671.*

* cited by examiner

DRIVER CIRCUIT FOR TRANSMITTER

BACKGROUND

Field of the Invention

The present invention relates generally to integrated circuits, and more particularly, to a driver circuit for a transmitter in a serial communication link.

Description of the Related Art

In a serial communication link, a Serializer-Deserializer (SerDes) includes a transmitter and a receiver to transmit and receive a stream of output data serially, as an output data signal, to and from another SerDes. The SerDes includes a control circuit that generates an input data signal. The transmitter includes a driver circuit that is connected to the control circuit. The driver circuit includes multiple inverters connected in series for outputting the input data signal as the output data signal. Each of the multiple inverters is implemented using multiple transistors.

Recent improvements in silicon fabrication process technology have led to a reduction in a size of a transistor (i.e., length of a gate of the transistor and gate-oxide thickness of the transistor). It is known to a person skilled in the art that a high voltage level of the supply voltage will damage the transistor because of the reduction in the transistor size. Hence, it is desirable to operate the driver circuit based on a low voltage level of a supply voltage to prevent damage due to the high voltage level of the supply voltage. Further, the operation of the driver circuit at the low voltage level of the supply voltage reduces the power consumption of the SerDes. The output data signal is at either a first or a second logic state. It is known to a person skilled in the art that a voltage swing (i.e., a difference in voltage levels of first and second logic states of the output data signal) corresponding to the output data signal is directly proportional to the supply voltage of an inverter of the multiple inverters of the driver circuit. Hence, the voltage swing corresponding to the output data signal is also low. Since, a difference between the voltage levels corresponding to the first and second logic states is low, the other SerDes may be unable to distinguish between the first and second logic states of the output data signal. This may corrupt the stream of output data that is transmitted to the other SerDes.

Typically, the SerDes is connected to a transmission line having an impedance. According to a well-known principle of high speed signal propagation on a transmission line, the output data signal from the transmitter of the SerDes is accurately received by the receiver of the other SerDes, when an impedance of the transmitter matches with the impedance of the transmission line. Typically, the driver circuit includes a resistor to match the impedance of the transmitter with the impedance of the transmission line. Due to irregularities in the fabrication process of the resistor, often the resistance of the resistor is not equal to a desired resistance. Hence, the impedance of the transmitter is not equal to the impedance of the transmission line. Hence, the output data signal from the transmitter is reflected back to the transmitter and is not accurately received by the receiver of the other SerDes.

A known technique for matching the impedance of the transmitter with the impedance of the transmission line is to include a set of driver circuits connected in parallel with each other in the transmitter in place of a single driver circuit. The set of driver circuits is collectively referred to as a transmitter-driver circuit. The control circuit includes multiple logic gates and generates a set of enable signals and a set of input data signals both corresponding to the set of driver circuits. Each driver circuit of the set of driver circuits is enabled or disabled based on a corresponding enable signal. When a driver circuit of the set of driver circuits is enabled, it offers a low impedance path for the corresponding input data signal and outputs the corresponding input data signal. When the driver circuit is disabled, it offers a high impedance path for the input data signal. The driver circuit acts as an open circuit (i.e., the driver circuit is in a tristate mode) and does not output the corresponding input data signal. Thus, an impedance of the transmitter-driver circuit is based on the set of enable signals. Hence, the impedance of the transmitter-driver circuit can be varied based on the set of enable signals in order to match the impedance of the transmitter-driver circuit with the impedance of the transmission line. However, the multiple logic gates increases the power consumption and the complexity of the transmitter. Also, the set of driver circuits does not increase the voltage swing of the output data signal.

A known technique for increasing the voltage swing corresponding to the output data signal is to provide a first supply voltage to an output inverter of the multiple inverters of each driver circuit of the set of driver circuits, and a second supply voltage to the other inverters of the multiple inverters except the output inverter. A voltage level of the first supply voltage is greater than a voltage level of the second supply voltage. The other inverters output an intermediate output data signal based on the second supply voltage. The output inverter receives the intermediate output data signal and outputs the output data signal based on the first supply voltage. Since a transistor of the output inverter typically operates based on the first supply voltage, operation of the transistor based on the second supply voltage causes the output inverter to introduce inaccuracies in the output data signal. Moreover, a large difference between the voltage levels of the first and second supply voltages may result in a voltage overstress for the output inverter that damages the output inverter.

A known technique to prevent the aforementioned problem is to further include a level-shifter in the transmitter-driver circuit. Further, the output inverter is implemented using multiple transistors that operate based on a high supply voltage, thereby accurately outputting the output data signal. The level-shifter is connected between the other inverters and the output inverter. The level-shifter shifts a voltage level of the intermediate output data signal such that a difference between the voltage levels of the intermediate output data signal and the second supply voltage is reduced. However, the level-shifter increases the complexity of the SerDes. Further, it also increases the power consumption of the SerDes along with a significant increase in the area occupied by the driver circuit. Further, the multiple transistors operating at the high supply voltage operate at a reduced speed as compared to the conventional transistors, thereby reducing the speed of operation of the SerDes.

It would be advantageous to have a driver circuit that varies an impedance of a transmitter and enables a high voltage swing of an output data signal without damaging an inverter of the driver circuit and without significantly increasing the area occupied and the power consumed by the driver circuit.

SUMMARY

In one embodiment of the present invention, a driver circuit is provided. The driver circuit includes a first inverter, a bias-control circuit, and a second inverter. The first inverter is connected between a first supply voltage and ground. The first inverter receives an input data signal and generates an inverted version of the input data signal. The bias-control circuit is connected between a second supply voltage and the first inverter. The bias-control circuit receives the inverted version of the input data signal and a bias signal. The bias-control circuit generates a level-shifted data signal based on the inverted version of the input data signal, the bias signal, and the second supply voltage. The bias-control circuit reduces a difference between voltage levels of the second supply voltage and the inverted version of the input data signal. The second inverter is connected between the second supply voltage and ground. The second inverter is further connected to the bias-control circuit and the first inverter for receiving the level-shifted data signal and the inverted version of the input data signal, respectively, and generating an output data signal.

In another embodiment of the present invention, a driver circuit is provided. The driver circuit includes a first inverter, a bias-control circuit, and a second inverter. The first inverter is connected between a first supply voltage and ground, receives an input data signal, and generates an inverted version of the input data signal. The first inverter includes first and second transistors. The first transistor has a source connected to the first supply voltage and a gate for receiving the input data signal. The second transistor has a source connected to ground, a gate connected to the gate of the first transistor, and a drain connected to a drain of the first transistor for outputting the inverted version of the input data signal. The bias-control circuit is connected between a second supply voltage and the first inverter, and receives the inverted version of the input data signal, a bias signal, and an enable signal. The bias-control circuit generates a level-shifted data signal at a first node of the driver circuit based on the inverted version of the input data signal, the bias signal, the enable signal, and the second supply voltage. The bias-control circuit reduces a difference between voltage levels of the second supply voltage and the inverted version of the input data signal. The bias-control circuit includes third and fourth transistors, a capacitor, and a first resistor. The third transistor has a source for receiving the bias signal and a gate for receiving an inverted version of the enable signal. The fourth transistor has a source connected to the second supply voltage, a gate for receiving the enable signal, and a drain connected to a drain of the third transistor. The first resistor is connected between the drain of the fourth transistor and the first node. The capacitor is connected between the drain of the second transistor and the first node. The second inverter is connected between the second supply voltage and ground. The second inverter is further connected to the first node and the first inverter for receiving the level-shifted data signal and inverted version of the input data signal, respectively, and generating an output data signal at a second node of the driver circuit. The second inverter includes fifth and sixth transistors. The fifth transistor has a source connected to the second supply voltage, a gate connected to the first node for receiving the level-shifted data signal, and a drain connected to the second node. The sixth transistor has a source connected to ground, a gate connected to the drain of the second transistor, and a drain connected to the second node for generating the output data signal at the second node.

In yet another embodiment of the present invention, a Serializer-Deserializer (SerDes) is provided. The SerDes includes a transmitter that includes a control circuit and a transmitter-driver circuit and outputs an output data signal. The control circuit is connected to first and second supply voltages and ground. The control circuit generates a first input data signal and a bias signal. The transmitter-driver circuit is connected to the control circuit and includes a first driver circuit. The transmitter-driver circuit receives the bias signal and the first input data signal corresponding to the first driver circuit, and outputs the output data signal. The first driver circuit includes a first inverter, a first bias-control circuit, and a second inverter. The first inverter is connected between the first supply voltage and ground. The first inverter receives the first input data signal and generates an inverted version of the first input data signal. The first bias-control circuit is connected between a second supply voltage and the first inverter. The first bias-control circuit receives the inverted version of the first input data signal and the bias signal and generates a first level-shifted data signal based on the inverted version of the first input data signal, the bias signal, and the second supply voltage. The first bias-control circuit reduces a difference between voltage levels of the second supply voltage and the inverted version of the first input data signal. The second inverter is connected between the second supply voltage and ground. The second inverter is further connected to the first bias-control circuit and the first inverter for receiving the first level-shifted data signal and the inverted version of the first input data signal, respectively, and generating the output data signal.

Various embodiments of the present invention provide a driver circuit, which includes a first inverter, a bias-control circuit, and a second inverter. The first inverter is connected between a first supply voltage and ground, receives an input data signal, and generates an inverted version of the input data signal. The bias-control circuit is connected between a second supply voltage and the first inverter. A voltage level of the second supply voltage is greater than a voltage level of the first supply voltage. The bias-control circuit receives the inverted version of the input data signal and a bias signal, and generates a level-shifted data signal, such that a difference between voltage levels of the second supply voltage and the inverted version of the input data signal is reduced. The second inverter is connected between the second supply voltage and ground. The second inverter is further connected to the bias-control circuit and the first inverter for receiving the level-shifted data signal and the inverted version of the input data signal, respectively, and generating an output data signal.

Thus, the reduction in the difference between voltage levels of the second supply voltage and the inverted version of the input data signal prevents a voltage overstress for the second inverter, protecting the second inverter from damage. The second inverter accurately outputs the output data signal with a voltage swing based on the second supply voltage. Since, the voltage level of the second supply voltage is greater than the voltage level of the first supply voltage, the second inverter provides a high voltage swing for a transmitter of a SerDes.

BRIEF DESCRIPTION OF DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF EMBODIMENTS

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

Figure 1:
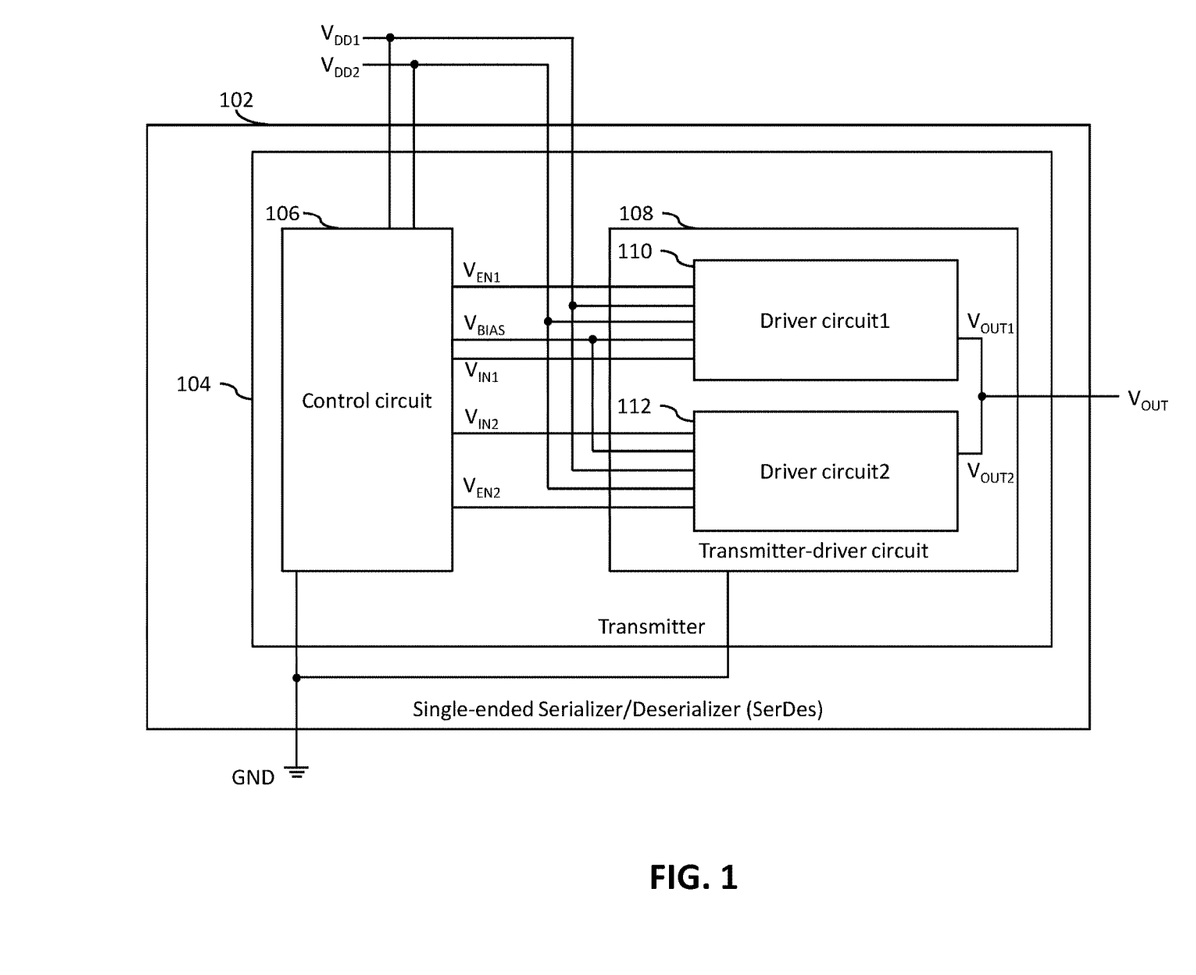
FIG. 1 is a schematic block diagram of a single-ended Serialiser-Deserializer (SerDes) that includes first and second driver circuits in accordance with an embodiment of the present invention.

Referring now to FIG. 1, a schematic block diagram of a single-ended Serializer-Deserializer (SerDes) 102 in accordance with an embodiment of the present invention is shown.

In a serial communication network (not shown), the single-ended SerDes 102 serially transmits a stream of output data as an output data signal $V_{OUT}$ to a transmission line (not shown). The single-ended SerDes 102 includes a transmitter 104 which includes a control circuit 106 and a transmitter-driver circuit 108. The transmitter-driver circuit 108 includes multiple driver circuits—two of which are shown—first and second driver circuits 110 and 112.

The control circuit 106 receives first and second supply voltages $V_{DD1}$ and $V_{DD2}$. The control circuit 106 generates first and second input data signals $V_{IN1}$ and $V_{IN2}$ corresponding to the first and second driver circuits 110 and 112, respectively. Further, the control circuit 106 generates a bias signal $V_{BIAS}$ based on the first and second supply voltages $V_{DD1}$ and $V_{DD2}$. The control circuit 106 also generates first and second enable signals $V_{EN1}$ and $V_{EN2}$ corresponding to the first and second driver circuits 110 and 112, respectively.

The first driver circuit 110 receives the first enable signal $V_{EN1}$ and the first input data signal $V_{IN1}$. Similarly, the second driver circuit 112 receives the second enable signal $V_{EN2}$ and the second input data signal $V_{IN2}$. The first and second driver circuits 110 and 112 are connected in parallel with each other, and output the output data signal $V_{OUT}$. Impedances offered by the first and second driver circuits 110 and 112 are based on logic states of the first and second enable signals $V_{EN1}$ and $V_{EN2}$. When the first enable signal $V_{EN1}$ is at a first logic state, the first driver circuit 110 is enabled and it outputs a first output data signal $V_{OUT1}$. Further, when the first enable signal $V_{EN1}$ is at a second logic state, the first driver circuit 110 is disabled and it does not output the first input data signal $V_{IN1}$. This is referred to as a 'tristate mode' of the first driver circuit 110. The second driver circuit 112 is structurally and functionally similar to the first driver circuit 110. The second driver circuit 112 outputs a second output data signal $V_{OUT2}$, when the second enable signal $V_{EN2}$ is at the first logic state. The output data signal $V_{OUT}$ includes at least one of the first and second output data signals $V_{OUT1}$ and $V_{OUT2}$ based on logic states of each of the first and second enable signals $V_{EN1}$ and $V_{EN2}$.

Figure 2:
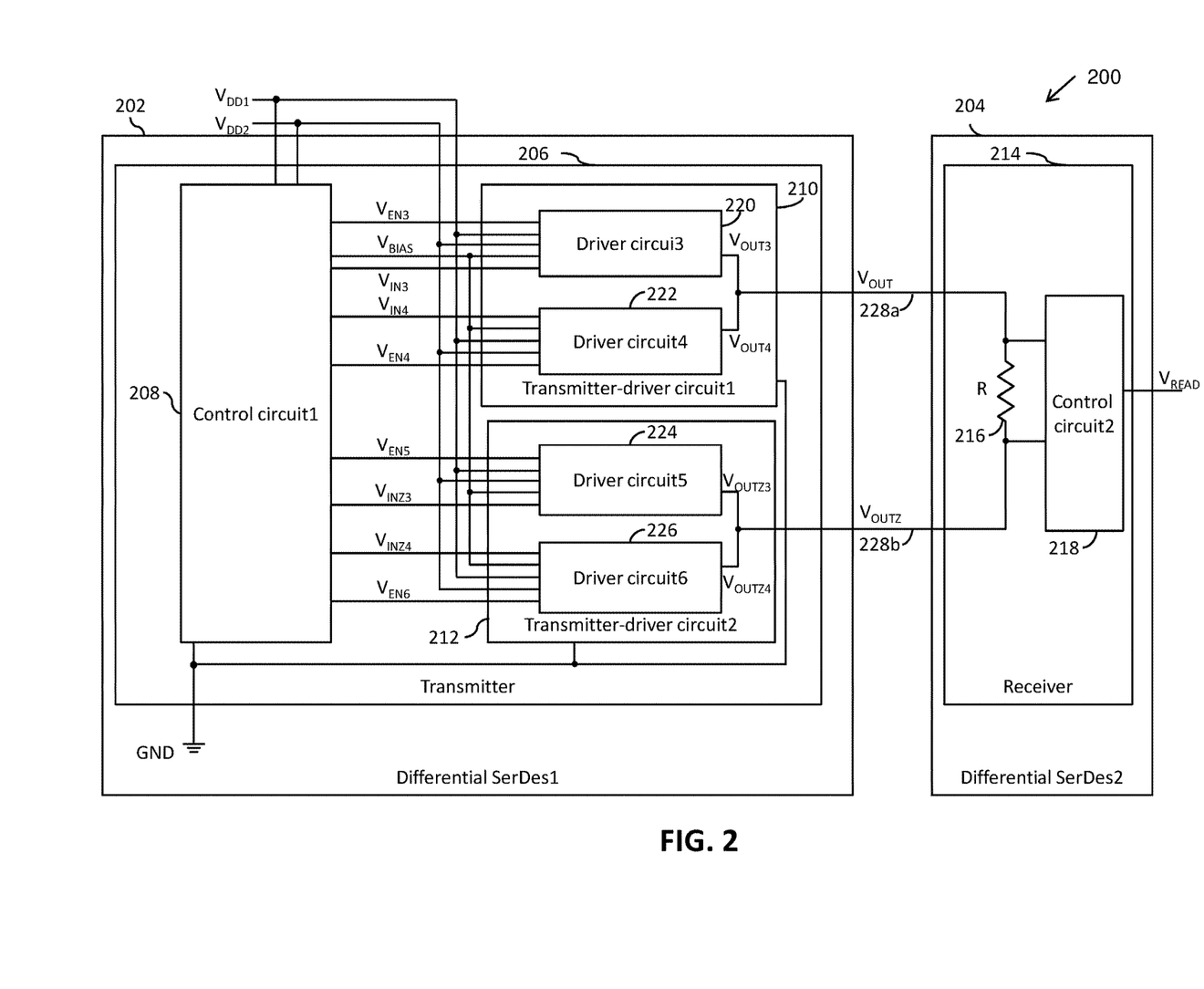
FIG. 2 is a schematic block diagram of a serial communication link including first and second differential SerDes in accordance with an embodiment of the present invention.

Referring now to FIG. 2, a schematic block diagram of a serial communication link 200 including first and second differential SerDes 202 and 204 in accordance with another embodiment of the present invention is shown. The first differential SerDes 202 is connected to the second differential SerDes 204, and transmits an output data signal $V_{OUT}$ to the second differential SerDes 204. The first differential SerDes 202 includes a transmitter 206 that includes a first control circuit 208 and first and second transmitter-driver circuits 210 and 212. The second differential SerDes 204 includes a receiver 214 that includes a resistor 216 and a second control circuit 218. Each of the first and second transmitter-driver circuits 210 and 212 includes multiple driver circuits—two of which are shown. The first transmitter-driver circuit 210 includes third and fourth driver circuits 220 and 222. The second transmitter-driver circuit 212 includes fifth and sixth driver circuits 224 and 226. The first and second transmitter-driver circuits 210 and 212 are connected by way of first and second transmission lines 228a and 228b, respectively, to the second differential SerDes 204. The first and second transmission lines 228a and 228b are collectively referred to as a transmission line 228.

The first control circuit 208 receives the first and second supply voltages $V_{DD1}$ and $V_{DD2}$. The first control circuit 208 generates third and fourth input data signals $V_{IN3}$ and $V_{IN4}$, and inverted versions of the third and fourth input data signals $V_{INZ3}$ and $V_{INZ4}$. Further, the first control circuit 208 generates the bias signal $V_{BIAS}$. The first control circuit 208 also generates third through sixth enable signals $V_{EN3}$-$V_{EN6}$ corresponding to the third through sixth driver circuits 220-226.

The third driver circuit 220 receives the third enable signal $V_{EN3}$ and the third input data signal $V_{IN3}$. Similarly, the fourth driver circuit 222 receives the fourth enable signal $V_{EN4}$ and the fourth input data signal $V_{IN4}$. The third and fourth driver circuits 220 and 222 output third and fourth output data signals $V_{OUT3}$ and $V_{OUT4}$, respectively. The third and fourth driver circuits 220 and 222 are connected in parallel with each other, and output the output data signal $V_{OUT}$. The output data signal $V_{OUT}$ includes at least one of the third and fourth output data signals $V_{OUT3}$ and $V_{OUT4}$ based on the logic states of each of the third and fourth enable signals $V_{EN3}$ and $V_{EN4}$. Thus, the first transmitter-driver circuit 210 outputs the output data signal $V_{OUT}$, which is transmitted to the second differential SerDes 204.

Similarly, the fifth and sixth driver circuits 224 and 226 receive the inverted versions of the third and fourth input data signals $V_{INZ3}$ and $V_{INZ4}$, respectively. Further, the fifth and sixth driver circuits 224 and 226 receive the fifth and sixth enable signals $V_{EN5}$ and $V_{EN6}$, respectively. The third through sixth driver circuits 220-226 are structurally and functionally similar to the first driver circuit 110 of FIG. 1. The structure of the first driver circuit 110 will be explained in conjunction with FIG. 3 below. Further, the second transmitter-driver circuit 212 is structurally and functionally similar to the first transmitter-driver circuit 210. The second transmitter-driver circuit 212 outputs an inverted version of the output data signal $V_{OUTZ}$, which is transmitted to the second differential SerDes 204.

The second differential SerDes 204 receives the output data signal $V_{OUT}$ and the inverted version of the output data signal $V_{OUTZ}$ at first and second terminals of the second control circuit 218 by way of the transmission line 228. The resistor 216 is connected across the first and second terminals of the second control circuit 218. The second control circuit 218 generates and outputs a read data signal $V_{READ}$ based on the output data signal $V_{OUT}$ and the inverted version of the output data signal $V_{OUTZ}$. The detailed operation of the single-ended SerDes 102 of FIG. 1, and the first and second differential SerDes 202 and 204 of FIG. 2 will be explained in conjunction with FIG. 3.

Figure 3:
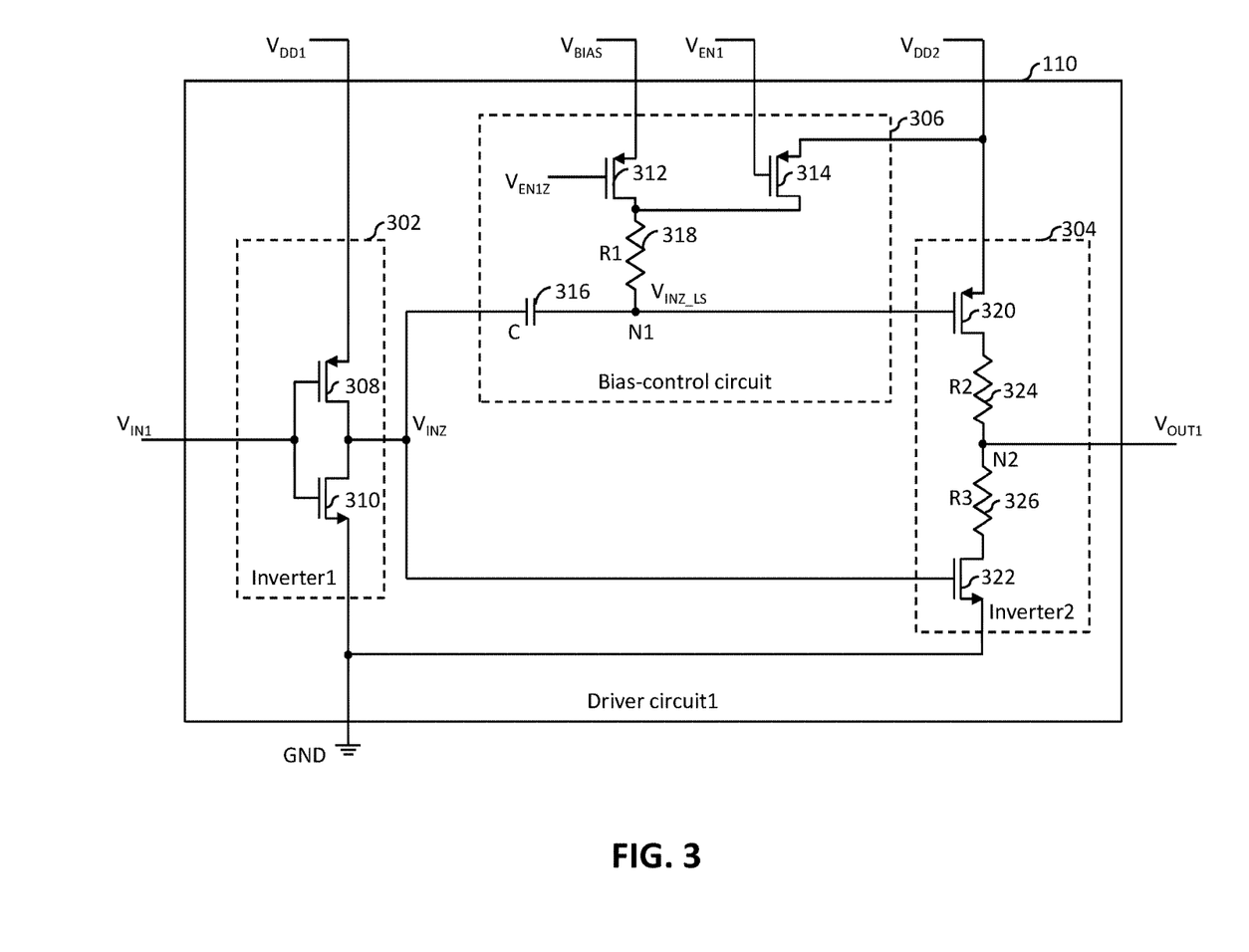
FIG. 3 is a schematic circuit diagram of the first driver circuit of FIG. 1 in accordance with an embodiment of the present invention.

Referring now to FIG. 3, a schematic circuit diagram of the first driver circuit 110 of FIG. 1 in accordance with an embodiment of the present invention is shown. The first driver circuit 110 includes first and second inverters 302 and 304 and a bias-control circuit 306. Since the second through sixth driver circuits 112, 220-226 are structurally and functionally similar to the first driver circuit 110, each of the second through sixth driver circuits 112, 220-226 also includes the first and second inverters 302 and 304 and the bias-control circuit 306. The first inverter 302 includes two transistors—first and second transistors 308 and 310. The bias-control circuit 306 includes third and fourth transistors 312 and 314, a capacitor 316, and a first resistor 318. The second inverter 304 includes two transistors—fifth and sixth transistors 320 and 322 and two resistors—second and third resistors 324 and 326. The bias-control circuit 306 is connected between the first inverter 302 and the second inverter 304. Resistance and capacitance of the first resistor 318 and the capacitor 316, respectively, are based on a frequency of the first and second input data signals $V_{IN1}$. In one embodiment, the first through fourth input data signals $V_{IN1}$-$V_{IN4}$ are direct-current (DC) balanced signals and hence, include a predetermined threshold frequency.

In the presently preferred embodiment, the first and second inverters 302 and 304 are complementary metal-oxide field effect transistor (CMOS) inverters. The first transistor 308 has a source that receives the first supply voltage $V_{DD1}$ and a gate that receives the first input data signal $V_{IN1}$. The second transistor 310 has a source connected to ground $V_{GND}$, a gate connected to the gate of the first transistor 308, and a drain connected to a drain of the first transistor 308. The second transistor 310 outputs an inverted version of the first input data signal $V_{INZ}$ at the drain thereof.

The capacitor 316 is connected between the gate of the first transistor 308 and a first node N1 of the first driver circuit 110. The third transistor 312 has a source that receives the bias signal $V_{BIAS}$ and a gate that receives an inverted version of the first enable signal $V_{EN1Z}$. The first resistor 318 is connected between a drain of the third transistor 312 and the first node N1. The fourth transistor 314 has a source that receives the second supply voltage $V_{DD2}$ and a gate that receives the first enable signal $V_{EN1}$. The fourth transistor 314 has a drain that is connected to the drain of the third transistor 312. The bias-control circuit 306 outputs a level-shifted data signal $V_{INZ\_LS}$ at the first node N1.

The fifth transistor 320 has a source that receives the second supply voltage $V_{DD2}$ and a gate connected to the first node N1 for receiving the level-shifted data signal $V_{INZ\_LS}$. The second resistor 324 is connected between a drain of the fifth transistor 320 and a second node N2 of the first driver circuit 110. The sixth transistor 322 has a source connected to ground and a gate connected to the drain of the second transistor 310. The third resistor 326 is connected between a drain of the sixth transistor 322 and the second node N2. The second inverter 304 outputs the first output data signal $V_{OUT1}$ at the second node N2.

In the presently preferred embodiment, the first and third through fifth transistors 308, 312, 314, and 320 are p-channel metal-oxide-semiconductor field effect transistors (PMOS), and the second and sixth transistors 310 and 322 are n-channel metal-oxide-semiconductor field effect transistors (NMOS).

In operation, the control circuit 106 of the single-ended SerDes 102 receives the first and second supply voltages $V_{DD1}$ and $V_{DD2}$ and generates the first and second input data signals $V_{IN1}$ and $V_{IN2}$, the first and second enable signals $V_{EN1}$ and $V_{EN2}$, and the bias signal $V_{BIAS}$. In the presently preferred embodiment, the bias signal $V_{BIAS}$ is defined by the following equation:

$$V_{BIAS}=V_{DD2}-(V_{DD1}/2) \quad (1)$$

The first inverter 302 receives the first input data signal $V_{IN1}$ and the first supply voltage $V_{DD1}$, and generates the inverted version of the first input data signal $V_{INZ}$. When the inverted version of the first input data signal $V_{INZ}$ is at the first logic state, a corresponding voltage level of the inverted version of the first input data signal $V_{INZ}$ is equal to the first supply voltage $V_{DD1}$. When the inverted version of the first input data signal $V_{INZ}$ is at the second logic state, a corresponding voltage level of the inverted version of the first input data signal $V_{INZ}$ is equal to a voltage level of ground $V_{GND}$ (i.e., 0V). Thus, the inverted version of the first input data signal $V_{INZ}$ varies from the voltage level of ground $V_{GND}$ to the first supply voltage $V_{DD1}$. Hence, a voltage swing of the inverted version of the first input data signal $V_{INZ\_SWING}$ is defined by the following equation:

$$V_{INZ\_SWING}=V_{DD1}-V_{GND} \quad (2)$$

In one embodiment, the control circuit 106 generates the first enable signal $V_{EN1}$ at the first logic state. Hence, the inverted version of the first enable signal $V_{EN1Z}$ is at the second logic state. The third transistor 312 receives the inverted version of the first enable signal $V_{EN1Z}$ and operates in a linear region. Hence, the third transistor 312 receives the bias signal $V_{BIAS}$ at its source and charges the first node N1 to a voltage level of the bias signal $V_{BIAS}$ by way of the first resistor 318. Further, the fourth transistor 314 receives the first enable signal $V_{EN1}$ and operates in a cut-off region. Hence, the fourth transistor 314 does not modify a voltage level of the first node N1.

The capacitor 316 receives the inverted version of the first input data signal $V_{INZ}$ and filters the inverted version of the first input data signal $V_{INZ}$. It is well-known to a person skilled in the art that the capacitor 316 blocks a direct current (DC) component of the inverted version of the first input data signal $V_{INZ}$, and outputs an alternating-current (AC) component of the inverted version of the first input data signal $V_{INZ}$ (i.e., the capacitor 316 couples the AC component of the inverted version of the first input data signal $V_{INZ}$, which is commonly known as 'AC coupling' in the art). The capacitor 316 either charges or discharges the first node N1 by a voltage level of a filtered and inverted version of the first input data signal $V_{INZ}$. As the first node N1 is at the voltage level of the bias signal $V_{BIAS}$, its voltage level increases and decreases with respect to the voltage level of the bias signal $V_{BIAS}$ based on the charging and discharging, respectively. Thus, the bias-control circuit 306 generates the level-shifted data signal $V_{INZ\_LS}$ at the first node N1. A voltage level of the level-shifted data signal at the first logic state $V_{INZ\_LS1}$ is defined by the following equation:

$$V_{INZ\_LS1}=V_{BIAS}+(V_{INZ\_SWING}/2) \quad (3)$$

A voltage level of the level-shifted data signal at the second logic state $V_{INZ\_LS2}$ is defined by the following equation:

$$V_{INZ\_LS2}=V_{BIAS}-(V_{INZ\_SWING}/2) \quad (4)$$

The fifth transistor 320 receives the level-shifted data signal $V_{INZ\_LS}$ at its gate and the second supply voltage $V_{DD2}$ at its source. When the level-shifted data signal $V_{INZ\_LS}$ is at the first and second logic states $V_{INZ\_LS1}$ and $V_{INZ\_LS2}$, the corresponding gate-to-source voltages at first and second logic states $V_{GS1}$ and $V_{GS2}$ for the fifth transistor 320 are defined by the following equations (5) and (6):

$$V_{GS1} = V_{INZ\_LS1} - V_{DD2} = 0 \quad (5)$$

$$V_{GS2} = V_{INZ\_LS2} - V_{DD2} = -V_{DD1} \quad (6)$$

In one example, voltage levels of the first and second supply voltages are equal to 1.2 volts (V) and 1.6 V, respectively. The voltage level of the bias signal $V_{BIAS}$ is equal to 1 V based on equation (1). The voltage level of the inverted version of the input data signal $V_{INZ}$ varies from 0 V to 1.2 V. According to equation (2), the voltage swing $V_{INZ\_SWING}$ corresponding to the inverted version of the input data signal $V_{INZ}$ is 1.2 V. The voltage level of the level-shifted data signal $V_{INZ\_LS}$ varies from 0.4 V to 1.6 V based on equations (3) and (4). According to equations (5) and (6), the gate-to-source voltage for the fifth transistor 320 varies from 0 to −1.2 V. In the absence of the bias-control circuit 306, the gate-to-source voltage varies from −0.4 V to −1.6 V, which causes a voltage overstress for the fifth transistor 320. Further, when the gate-to-source voltage at the first logic state is equal to −0.4 V, the fifth transistor 320 is not in the cut-off region. Thus, the bias-control circuit 306 reduces a difference between the voltage levels of the inverted version of the input data signal $V_{INZ}$ and the second supply voltage $V_{DD2}$ from 0.4 V to 0 V when the inverted version of the input data signal $V_{INZ}$ is at the first logic state and from 1.6 V to 1.2 V when the inverted version of the input data signal $V_{INZ}$ is at the second logic state. Further, the sixth transistor 322 receives the inverted version of the first input data signal $V_{INZ}$. Thus, the second inverter 304 outputs the first output data signal $V_{OUT1}$. Similarly, the second driver circuit 112 receives the second enable signal $V_{EN2}$, the second input data signal $V_{INZ}$, and the bias signal $V_{BIAS}$ and outputs the second output data signal $V_{OUT2}$ when the second enable signal $V_{EN2}$ is at the first logic state.

In another embodiment, the control circuit 106 generates the first enable signal $V_{EN1}$ at the second logic state and the first input data signal $V_{IN1}$ at the first logic state. When the first enable signal $V_{EN1}$ is at the second logic state, the inverted version of the first enable signal $V_{EN1Z}$ is at the first logic state. The third transistor 312 receives the inverted version of the first enable signal $V_{EN1Z}$ and operates in the cut-off region. The fourth transistor 314 receives the first enable signal $V_{EN1}$ and operates in the linear region. Hence, the fourth transistor 314 receives the second supply voltage $V_{DD2}$ at its source and charges the first node N1 to the second supply voltage $V_{DD2}$ by way of the first resistor 318. A voltage level of the level-shifted data signal at the first logic state $V_{INZ\_LS1}$ is defined by the following equation:

$$V_{INZ\_LS1} = V_{DD2} + (V_{INZ\_SWING}/2) \quad (7)$$

A voltage level of the level-shifted data signal at the second logic state $V_{INZ\_LS2}$ is defined by the following equation:

$$V_{INZ\_LS2} = V_{DD2} - (V_{INZ\_SWING}/2) \quad (8)$$

Based on the equations (5), (6), (7), and (8), the fifth transistor 320 operates in the cut-off region. Further, the inverted version of the first input data signal $V_{INZ}$ is at the second logic state. Hence, the sixth transistor 322 also operates in the cut-off region. Thus, the second inverter 304 offers a high impedance for the first input data signal $V_{IN1}$ and does not output the first output data signal $V_{OUT1}$. Similarly, the second driver circuit 112 does not output the second output data signal $V_{OUT2}$ when the second enable signal $V_{EN2}$ is at the second logic state.

An output impedance of the single-ended SerDes 102 includes the impedances of the first and second driver circuits 110 and 112. Hence, the logic states of the first and second enable signals $V_{EN1}$ and $V_{EN2}$ are programmed such that the output impedance of the single-ended SerDes 102 is matched with an impedance of the transmission line 228 to accurately transmit the output data signal $V_{OUT}$ without reflection. When the first and second enable signals $V_{EN1}$ and $V_{EN2}$ are at the first and second logic states, the output data signal $V_{OUT}$ includes the first output data signal $V_{OUT1}$. When the first and second enable signals $V_{EN1}$ and $V_{EN2}$ are at the second and first logic states, the output data signal $V_{OUT}$ includes the second output data signal $V_{OUT1}$. When each of the first and second enable signals $V_{EN1}$ and $V_{EN2}$ are at the first logic state, the output data signal $V_{OUT}$ includes a sum of the first and second output data signals $V_{OUT1}$ and $V_{OUT2}$. In the first differential SerDes 202, the first control circuit 208 receives the first and second supply voltages $V_{DD1}$ and $V_{DD2}$ and generates the third and fourth input data signals $V_{IN3}$ and $V_{IN4}$, the inverted versions of the third and fourth input data signals $V_{INZ3}$ and $V_{INZ4}$, the third through sixth enable signals $V_{EN3}$-$V_{EN6}$, and the bias signal $V_{BIAS}$. In one embodiment, each of the third through sixth enable signals $V_{EN3}$-$V_{EN6}$ are at the first logic state and the third through sixth driver circuits 220-226 are enabled.

An output impedance of the first differential SerDes 202 includes an impedance of the fifth and sixth transistors 320 and 322 of each of the third through sixth driver circuits 220-226, and an impedance of the second and third resistors 324 and 326 of each of the third through sixth driver circuits 220-226. The output impedance of the first differential SerDes 202 is equal to an input impedance of the second differential SerDes 204, which is an impedance of the resistor 216. Hence, a voltage difference across the resistor 216 is equal to a voltage difference across the fifth and sixth transistors 320 and 322 and the second and third resistors 324 and 326 of each of the third through sixth driver circuits 220-226. Thus, the second and third resistors 324 and 326 connected in series with the fifth and sixth transistors 320 and 322 reduce a voltage difference across the fifth and sixth transistors 320 and 322 of each of the third through sixth driver circuits 220-226. This prevents a voltage overstress for the second inverter 304.

The third and fourth driver circuits 220 and 222 output the output data signal $V_{OUT}$ in a similar way as the first and second driver circuits 110 and 112 output the output data signal $V_{OUT}$. Further, the fifth and sixth driver circuits 224 and 226 output the inverted version of the output data signal $V_{OUTZ}$ in a similar way as the first and second driver circuits 110 and 112 output the output data signal $V_{OUT}$. The second differential SerDes 204 receives the output data signal $V_{OUT}$ and the inverted version of the output data signal $V_{OUTZ}$ across the resistor 216. The second control circuit 218 outputs the read data signal $V_{READ}$.

Thus, the first through sixth driver circuits 110, 112, 220-226 generate the output data signal $V_{OUT}$ with a high voltage swing. The bias-control circuit 306 ensures that the second inverter 304 in each driver circuit of the first through sixth driver circuits 110, 112, 220-226, is protected from damage due to the voltage overstress in the single-ended and first differential SerDes 102 and 202. Further, the bias-control circuit 306 includes the capacitor 316 and the first resistor 318 for controlling the bias signal $V_{BIAS}$ instead of a level-shifter and a set of logic gates. Also, the bias-control circuit 306 includes two transistors (i.e., the third and fourth transistors 312 and 314) for enabling and disabling the first driver circuit 110 instead of a set of logic gates. Thus, on account of the absence of the level-shifter and the set of logic gates, each driver circuit of the first through sixth driver circuits 110, 112, 220-226 occupies less area and consumes less power as compared to the traditional driver circuit.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention. No element, act, or instruction used in the present application should be construed as critical or essential to the invention unless explicitly described as such. Further, the phrase "based on" is intended to mean "based, at least in part, on" unless explicitly stated otherwise.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A driver circuit, comprising:
a first inverter, connected between a first supply voltage and ground, that receives an input data signal and generates an inverted version of the input data signal;
a bias-control circuit, connected between a second supply voltage and the first inverter, that receives the inverted version of the input data signal and a bias signal and generates a level-shifted data signal based on the inverted version of the input data signal, the bias signal, and the second supply voltage, wherein the bias-control circuit reduces a difference between voltage levels of the second supply voltage and the inverted version of the input data signal, and a voltage level of the bias signal is equal to a difference between a voltage level of the second supply voltage and half of a voltage level of the first supply voltage; and
a second inverter, connected between the second supply voltage and the ground, that is connected to the bias-control circuit and the first inverter for receiving the level-shifted data signal and the inverted version of the input data signal, respectively, and generating an output data signal.

2. The driver circuit of claim 1, wherein the first inverter comprises:
a first transistor having a source connected to the first supply voltage and a gate for receiving the input data signal; and
a second transistor having a source connected to the ground, a gate connected to the gate of the first transistor, and a drain connected to a drain of the first transistor for outputting the inverted version of the input data signal.

3. The driver circuit of claim 2, wherein the bias-control circuit comprises:
a first resistor that receives the bias signal and is connected to a first node of the driver circuit; and
a capacitor that is connected between the drain of the second transistor and the first node.

4. The driver circuit of claim 3, wherein the bias-control circuit further comprises:
a third transistor having a source for receiving the bias signal, a gate for receiving an inverted version of an enable signal, and a drain connected to the first resistor; and
a fourth transistor having a source connected to the second supply voltage, a gate for receiving the enable signal, and a drain connected to the drain of the third transistor, wherein the third and fourth transistors are p-channel metal-oxide semiconductor (PMOS) transistors.

5. The driver circuit of claim 3, wherein a resistance of the first resistor and a capacitance of the capacitor are based on a frequency of the input data signal.

6. The driver circuit of claim 3, wherein the second inverter comprises:
a third transistor having a source connected to the second supply voltage, a gate connected to the first node for receiving the level-shifted data signal, and a drain connected to a second node of the driver circuit; and
a fourth transistor having a source connected to the ground, a gate connected to the drain of the second transistor, and a drain connected to the second node for generating the output data signal at the second node.

7. The driver circuit of claim 6, wherein the drain of the third transistor and the drain of the fourth transistor are connected to the second node by way of second and third resistors, respectively.

8. The driver circuit of claim 7, wherein the first and third transistors are PMOS transistors, and the second and fourth transistors are n-channel metal-oxide semiconductor (NMOS) transistors.

9. A driver circuit, comprising:
a first inverter, connected between a first supply voltage and ground, that receives an input data signal and generates an inverted version of the input data signal, the first inverter comprising:
a first transistor having a source connected to the first supply voltage and a gate for receiving the input data signal; and
a second transistor having a source connected to the ground, a gate connected to the gate of the first transistor, and a drain connected to a drain of the first transistor for outputting the inverted version of the input data signal;
a bias-control circuit, connected between a second supply voltage and the first inverter, that receives the inverted version of the input data signal, a bias signal, and an enable signal and generates a level-shifted data signal at a first node of the driver circuit based on the inverted version of the input data signal, the bias signal, the enable signal, and the second supply voltage, wherein the bias-control circuit reduces a difference between voltage levels of the second supply voltage and the inverted version of the input data signal, and wherein the bias-control circuit comprises:
a third transistor having a source for receiving the bias signal and a gate for receiving an inverted version of the enable signal;
a fourth transistor having a source connected to the second supply voltage, a gate for receiving the enable signal, and a drain connected to a drain of the third transistor;

a first resistor that is connected between the drain of the fourth transistor and the first node; and a capacitor that is connected between the drain of the second transistor and the first node; and a second inverter, connected between the second supply voltage and the ground, that is connected to the first node and the first inverter for receiving the level-shifted data signal and the inverted version of the input data signal, respectively, and generating an output data signal at a second node of the driver circuit, the second inverter comprising:

a fifth transistor having a source connected to the second supply voltage, a gate connected to the first node for receiving the level-shifted data signal, and a drain connected to the second node; and a sixth transistor having a source connected to the ground, a gate connected to the drain of the second transistor, and a drain connected to the second node for generating the output data signal at the second node.

10. The driver circuit of claim 9, wherein a resistance of the first resistor and a capacitance of the capacitor are based on a frequency of the input data signal.

11. The driver circuit of claim 9, wherein the drain of the fifth transistor and the drain of the sixth transistor are connected to the second node by way of second and third resistors, respectively.

12. The driver circuit of claim 9, wherein the first and third through fifth transistors are p-channel metal-oxide semiconductor (PMOS) transistors, and the second and sixth transistors are n-channel metal-oxide semiconductor (NMOS) transistors.

13. The driver circuit of claim 9, wherein a voltage level of the bias signal is equal to a difference between a voltage level of the second supply voltage and half of a voltage level of the first supply voltage.

14. A serializer-deserializer (SerDes), comprising:

a transmitter that outputs an output data signal, the transmitter comprising:

a control circuit, connected to first and second supply voltages and ground, that generates a first input data signal and a bias signal; and a transmitter-driver circuit, connected to the control circuit, that includes a first driver circuit, receives the bias signal and the first input data signal, and outputs the output data signal, wherein the first driver circuit comprises:

a first inverter, connected between the first supply voltage and the ground, that receives the first input data signal and generates an inverted version of the first input data signal;

a first bias-control circuit, connected between a second supply voltage and the first inverter, that receives the inverted version of the first input data signal and the bias signal and generates a first level-shifted data signal based on the inverted version of the first input data signal, the bias signal, and the second supply voltage, wherein the first bias-control circuit reduces a difference between voltage levels of the second supply voltage and the inverted version of the first input data signal, and a voltage level of the bias signal is equal to a difference between a voltage level of the second supply voltage and half of a voltage level of the first supply voltage; and a second inverter, connected between the second supply voltage and the ground, that is connected to the first bias-control circuit and the first inverter for receiving the first level-shifted data signal and the inverted version of the first input data signal, respectively, and generating the output data signal.

15. The SerDes of claim 14, wherein the transmitter-driver circuit further comprises:

a second driver circuit that receives a second input data signal from the control circuit, wherein the second driver circuit is connected in parallel with the first driver circuit, and wherein the second driver circuit comprises:

a third inverter, connected between the first supply voltage and the ground, that receives the second input data signal and generates an inverted version of the second input data signal;

a second bias-control circuit, connected between the second supply voltage and the third inverter, that receives the inverted version of the second input data signal and the bias signal and generates a second level-shifted data signal based on the inverted version of the second input data signal, the bias signal, and the second supply voltage, wherein the second bias-control circuit reduces a difference between voltage levels of the second supply voltage and the inverted version of the second input data signal; and a fourth inverter, connected between the second supply voltage and the ground, that is connected to the second bias-control circuit and the third inverter for receiving the second level-shifted data signal and the inverted version of the second input data signal, respectively, and generating the output data signal.

16. The SerDes of claim 15, wherein each of the first and third inverters comprises:

a first transistor having a source connected to the first supply voltage and a gate for receiving at least one of the first and second input data signals; and a second transistor having a source connected to the ground, a gate connected to the gate of the first transistor, and a drain connected to a drain of the first transistor for outputting the inverted version of the at least one of the first and second input data signals.

17. The SerDes of claim 16, wherein the each of the first and second bias-control circuits comprises:

a first resistor that receives the bias signal and is connected to a first node of at least one of the first and second driver circuits; and a capacitor that is connected between the drain of the second transistor and the first node.

18. The SerDes of claim 17, wherein the control circuit further generates first and second enable signals corresponding to the first and second driver circuits.

19. The SerDes of claim 18, wherein each of the first and second bias-control circuits further comprises:

a third transistor having a source for receiving the bias signal, a gate for receiving an inverted version of the at least one of the first and second enable signals, and a drain connected to the first resistor; and a fourth transistor having a source connected to the second supply voltage, a gate for receiving at least one of the first and second enable signals, and a drain connected to the drain of the third transistor, wherein the third and fourth transistors are p-channel metal-oxide semiconductor (PMOS) transistors.

20. The SerDes of claim 18, wherein the control circuit generates the first enable signal at a first logic state for enabling the first driver circuit and generates the first enable signal at a second logic state and the first input data signal at the first logic state for disabling the first driver circuit, and wherein the control circuit generates the second enable signal at the first logic state for enabling the second driver circuit and generates the second enable signal at the second logic state and the second input data signal at the first logic state for disabling the second driver circuit.

21. The SerDes of claim 17, wherein a resistance of the first resistor and a capacitance of the capacitor are based on a frequency of the first and second input data signals.

22. The SerDes of claim 17, wherein each of the second and fourth inverters comprises:
   a third transistor having a source connected to the second supply voltage, a gate connected to the first node for receiving the at least one of the first and second level-shifted data signals, and a drain connected to a second node of the at least one of the first and second driver circuits; and
   a fourth transistor having a source connected to the ground, a gate connected to the drain of the second transistor, and a drain connected to the second node for generating the output data signal at the second node.

23. The SerDes of claim 22, wherein the drain of the third transistor and the drain of the fourth transistor are connected to the second node by way of second and third resistors, respectively.

24. The SerDes of claim 22, wherein the first and third transistors are PMOS transistors, and the second and fourth transistors are n-channel metal-oxide semiconductor (NMOS) transistors.

* * * * *